United States Patent Office 3,269,346
Patented August 30, 1966

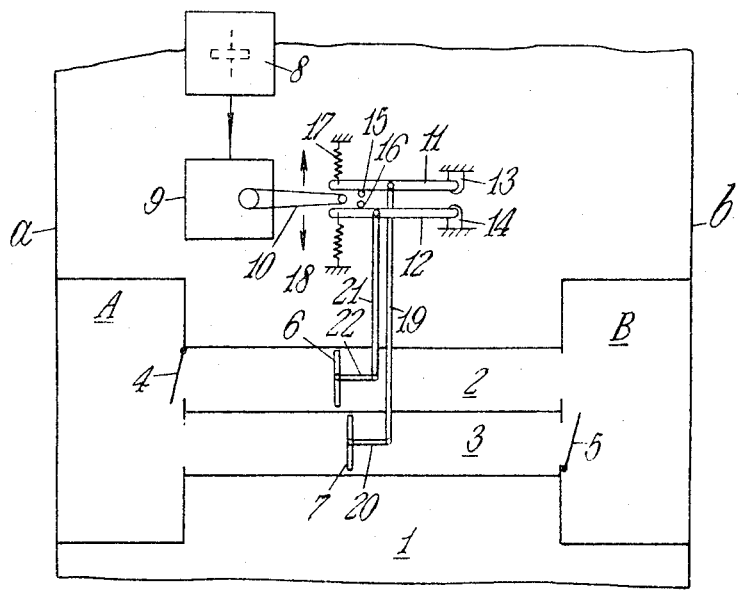
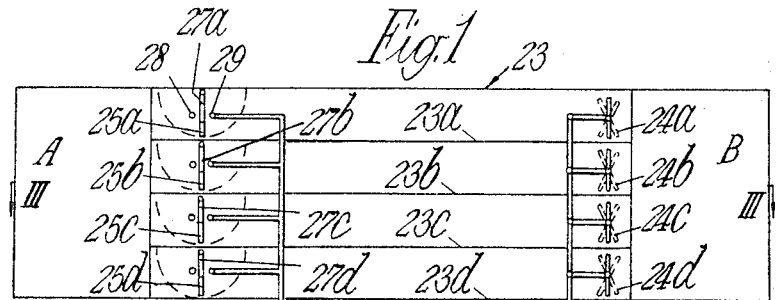
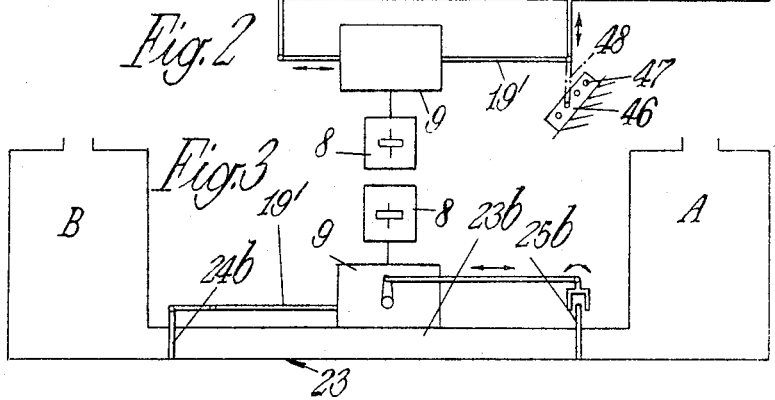

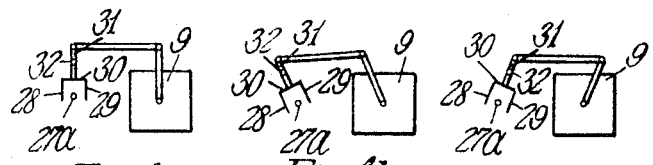
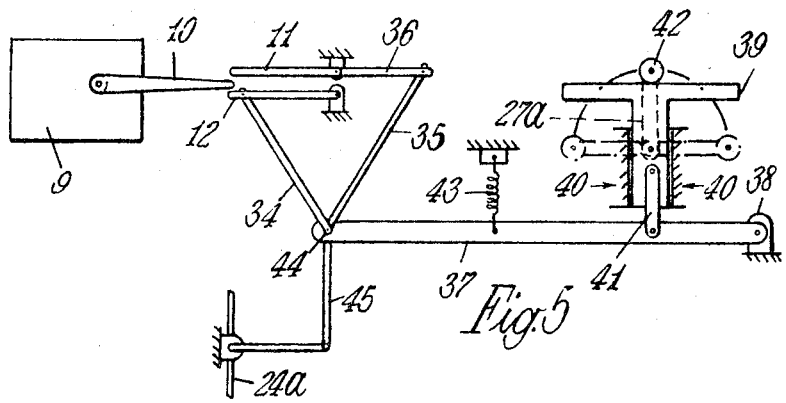
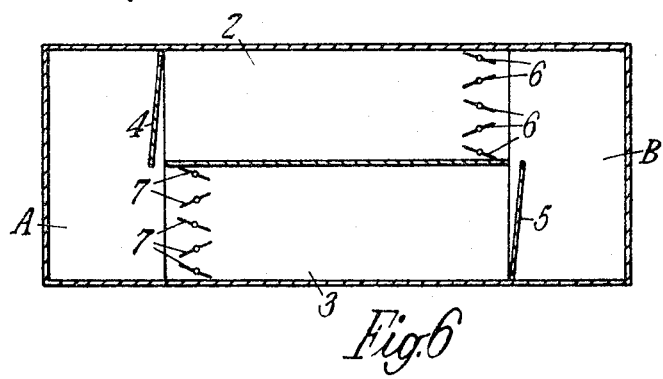

1

3,269,346
PASSIVE TANK STABILIZERS FOR
FLOATING BODIES
John Bell, Beckenham, England, assignor to Muirhead &
Co. Limited, Beckenham, England, a British company
Filed Feb. 26, 1965, Ser. No. 435,613
Claims priority, application Great Britain, Mar. 2, 1964,
8,775/64
7 Claims. (Cl. 114—125)

This application is a continuation-in-part of application No. 369,081 filed on May 21, 1964, and now abandoned.

This invention relates to passive tank stabilizers for floating bodies such as ships.

Passive tanks, whether with free water surface or of the kind in which the tanks are connected by a conduit or tunnel completely filled with water, or other fluid, have been known for many years. It is known that their performance in stabilizing the rolling motion of the ship while effective under certain conditions is less effective under others. For example, maximum roll reduction is obtained when the tank system is tuned to the natural rolling period of the ship and the ship is being subjected to a steady wave-motion which synchronizes with the ship's natural rolling period. Should the ship, however, with the tanks thus tuned encounter waves which are not synchronous with the ship's rolling period the amount of roll reduction achieved is considerably less; in fact, under certain conditions the rolling would even be more than with the tanks out of action. A further feature which is a distinct disadvantage is that under certain conditions when the natural period of the ship differs only slightly from the wave-period a beat or heterodyne effect is apparent which gives rise to irregular and disturbing motion, for this reason a practical passive tank system has hitherto been detuned from its condition of maximum efficiency, generally by the insertion of resistance to the flow of the water.

It is an object of the present invention to control the flow of water within a passive tank system so as to avoid these difficulties while operating at maximum efficiency and so obtain maximum roll reduction at all times.

The invention consists in a stabilizing system for a floating body comprising tanks for containing liquid disposed one on each side of the floating body, at least one channel interconnecting the two tanks, roll-sensitive means mounted on the floating body, control valve means mounted in said channel and responsive to said roll-sensitive means to permit flow of liquid through the channel in the direction required for stabilizing the roll of the floating body and non-return valve means mounted to control the flow of liquid through the channel whereof flow therethrough in the opposite direction is prevented.

The roll-sensitive means employed would conveniently be gyroscopic and provide signals proportional to roll angle, roll velocity and roll acceleration, and the acceleration function would normally provide the major operative signal.

Conveniently two channels may be provided interconnecting the tanks, each with control valves, the non-return valves in the two channels acting in the opposite direction.

Alternatively, one or more channels are provided and the non-return means are constructed so as to be operated or "phased" from the roll-sensitive means to act as non-return in the one direction or the other, as may be required to prevent flow in the opposite direction to that which is required to stabilize the floating body against the roll.

To obtain maximum operating efficiency the tanks and connecting channel or channels are so proportioned that the fluid flow is tuned to a periodic response time, equal to or rather shorter than the natural rolling period of

2 the vessel to be stabilized. The system is further designed to avoid resistance to the flow of fluid. In a preferred design the resistance is such that with a repeated roll of the vessel of $x$ degrees at the tuned frequency, the angular movement of the fluid surface will build up to a multiple of $x$ degrees greater than unity. Conveniently, such multiple may be of the order of 3 or even more.

In order to provide a moderate degree of stabilization when the control valves are not in operation in response to the roll-sensitive means, due either to a failure of the electrical supply or of the mechanism, or as a stand-by condition when it is desired to disconnect all power supplies, means may be provided for increasing the resistance to flow between the tanks. The resistance unit or units may be inserted manually or automatically in the event of a power supply failure. In such a condition of operation phased non-return valves would be released, allowing the fluid to flow in either direction.

The invention will be further described with reference to the accompanying drawings.

FIGURE 1 is a diagrammatic horizontal section part of a ship showing a passive tank stabilizing system according to the invention;

FIGURE 2 is a diagrammatic plan view in partial section of a further embodiment of the invention;

FIGURE 3 is a cross section on the line III—III of FIGURE 2; and FIGURES 4a, b and c are details of a lock and release mechanism of FIGURES 2 and 3;

FIGURE 5 is a diagrammatic view of a recentering mechanism for use in conjunction with the lock and release mechanism of FIGURES 4a, b and c;

FIGURE 6 is a plan view of a further embodiment of the invention;

Figure 7:
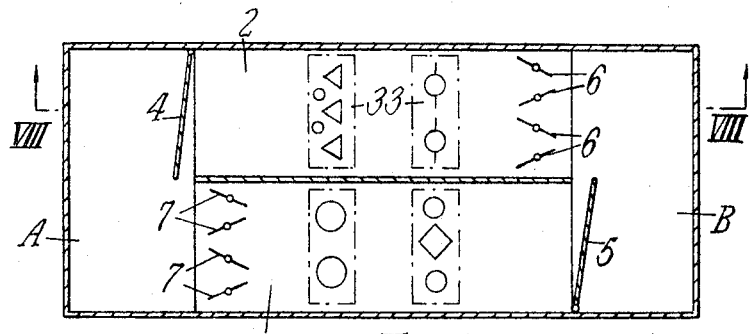
FIGURE 7 is the same view as FIGURE 6 with additions.

In FIGURE 1 of the drawing tanks A and B are disposed at the sides $a$ and $b$ respectively of a ship 1. The tanks A and B are connected by two channels 2 and 3. In channel 2, at the entrance to tank A, is provided a non-return valve 4 and in channel 3 is similarly disposed a non-return valve 5. Furthermore, in channel 2 is disposed a mechanically operated valve 6 and in channel 3 is disposed a mechanically operated valve 7.

Gyroscope means generally represented at 8 produces the control signal in known manner in response to the motion of the ship which control signal operates a power means 9 which may comprise any amplifying means, for example, a hydraulic relay. The output arm 10 of hydraulic relay 9 is arranged as shown to operate levers 11 and 12. Lever 11 is pivoted at 13 and lever 12 is pivoted at 14. With the output arm 10 in the central or neutral position as shown, lever 11 is in contact with stop 15 and lever 12 is in contact with stop 16 the levers being urged thereto by compression springs 17 and 18 respectively. Lever 11 is linked with valve 7 for the operation thereof by rod 19 and crank 20 and lever 12 is similarly linked with valve 6 by rod 21 and crank 22. Thus, it will be seen that with a movement of output arm 10 in the direction of the upwardly pointing arrow, valve 7 will be opened with a movement of output arm 10 in the direction of the downwardly pointing arrows, valve 6 will be opened. Each of valves 6 and 7 when not being operated by the output arm 10 are maintained in the closed position by springs 18 and 17 respectively.

The amount by which either valve is opened is determined by the amount of movement of output arm 10 in the appropriate direction, which, in turn, is determined by the signal derived from the gyroscopic sensing means.

Thus, in operation, the flow of water between the tanks A and B is regulated by valves 6 and 7 and undesirable effects are prevented by means of non-return valves 4 and 5 to give optimum stabilization under all sea conditions whether the ship is proceeding on course or is stationary.

Thus, when according to the control, fluid is required to flow from tank A to tank B the control valve 7 in channel 3 will open. Should, however, the disposition of the fluid in the tanks or, alternatively or additionally a lateral acceleration be imposed on the ship thereby causing a sideways motion be such that fluid could only flow from tank B to tank A, this flow would be prevented by the closing of the non-return valve 5 in the channel 3. Similarly, the flow of liquid from tank B to tank A is allowed along channel 2 when the control functions developed by the gyroscopic means indicate that this is required.

It will be appreciated that the lateral motion of the ship previously referred to which may bring into operation the non-return valve will be apparent when the lengthwise plane of the ship is coincident with the plane of the oncoming waves or otherwise the ship is lying to a beam sea.

The tanks may be "tuned" e.g. by regulating the total quantity of water in the system, by altering the geometry of the interconnecting channel and to some extent by altering the shape of the tanks.

Since a rapid transfer of liquid from one tank to the other is desirable, ample cross-sectional area of the channel is important. The dimensions of the tank limit the width of the channels and if adequate cross-sectional area is sought by heightening the channels, the effective hydrostatic head in the tanks is adversely affected since a limited space only is generally available for accommodating the stabilizers.

Reference to FIGURE 1 shows two channels 2 and 3, interconnecting tanks A and B, with non-return valves 4 and 5 respectively in the channels. The valves 4 and 5 ensure only a unidirectional flow in each of the channels 2 and 3. This infers that one channel is effective for a roll in one direction, say from port to starboard, and the other channel is effective for a roll from starboard to port.

With the arrangement proposed in FIGURE 1, therefore, there is a disadvantage as regards cross-sectional area of channel in that only one half of the possible cross-sectional area is utilized at any time.

If now a single channel for the transfer of liquid in both directions is envisaged then the width of the channel may equal the width of the tank and for an optimum cross-sectional area the height may be proportionately lowered giving a higher working head in the tanks. Such an embodiment is shown in FIGURES 2 and 3.

In FIGURES 2 and 3, port tank A' and starboard tank B', are connected by enclosed channel 23. For convenience channel 23 is subdivided into channels 23a, b, c and d, in which are accommodated controlled valves 24a, b, c and d, and also, non-return valves 25a, b, c and d.

The roll sensing means 8', which may be a gyroscope or gyroscopes controls the movement of a power amplifying device such as a hydraulic relay 9'.

Hydraulic relay 9' operates control valves 24a to 24d, over linkage 19' in accordance with signals received from the roll sensing means 8'. Non-return valves 25a to 25d are provided with arms 27a to 27d (FIGURES 2 and 4), the free end of which engages the inside surfaces of tines 28 and 29 (FIGURE 4) of the fork 30, attached to one end of a short lever 31, pivoted at 32. The other end of lever 32 is actuated by hydraulic amplifier 9' and holds the non-return valve in the closed position when the control signal is zero. Operation of the hydraulic relay in response to a control signal as in FIGURE 4b retains the stop 28 against the opening in one direction of the non-return valve and releases stop 29 for valves 25a to 25d to open in the other direction, the said opening being effected by the pressure of water on the valve surface.

The pressure of water may now open valves 25a–25d fully; if however, the pressure of water is in the opposite direction the valves will be kept closed by the tine 28. FIGURE 4c shows the conditions when hydraulic relay 9 operates lever 31 in the opposite direction thereby releasing valve 25 to open fully in the direction of the arrow.

Preferably the non-return valves are mechanically recentered, for example by a slide and spring mechanism, as shown in FIGURE 5, to the closed position.

In FIGURE 5 hydraulic relay 9' operates levers 11' and 12' successively in opposite directions as shown in FIGURE 1. Lever 11' has an extension 36 on the opposite side of the pivot point as shown. Arm 34 is pivoted to lever 12' and arm 35 is pivoted to the extension 36 of lever 11'. The opposite ends of arms 34 and 35 are pivoted to a common point on arm 37 which is pivoted at 38. Thus, whichever one of levers 11' and 12', is operated, the movement imparted to arm 37 is in the same direction i.e., downwards in the figure.

T-shaped slide 39 is capable of linear motion between slideways 40, the motion thereof being imparted by arm 37 over link 41.

The operating arm 27a of a non-return valve 25 (not shown) carries at its extremity a roller 42, which roller rests on the upper surface of T-shaped slide 39 when the control signal is zero and arm 10' of hydraulic relay 9' is centralized. It will be seen that under these conditions the non-return valve 25 is held in the closed position but when either of the levers 11' and 12' is displaced by hydraulic relay 9' the slide 39 will be lowered thus releasing the non-return valve 25 to take up either of the positions indicated by the dotted lines as determined by whichever of the stops 28 and 29 has been deflected. Re-setting spring 43 assists in returning the arm 37 to the upwards or zero position. The upper surface of T-shaped slide 39 may be cam shaped to suit any law of release of arm 27a. In this construction the control valves 24a FIGURE 2 may be operated from point 44 on arm 37 over link 45.

While the controls are in operation, adequate stabilization would be available for all normal loading conditions of the vessel which may alter its resonant period.

If, however, the power supply should fail, or if, for any other reason, the mechanism should not be operating, it is desirable that the stabilizing tank system should be still available as a stabilizer, although with reduced efficiency. To effect this, it is necessary to insert in the connecting channel or channels resistance to the flow of water which will dissipate the energy transmitted by the sea to the fluid contained in the tanks. Various embodiments of this facility are shown in FIGURES 6 to 9.

In FIGURE 6 the control valves 6a, 7a themselves may be set to a desired position constricting the water flow to give a hydraulic loss.

Figure 8:
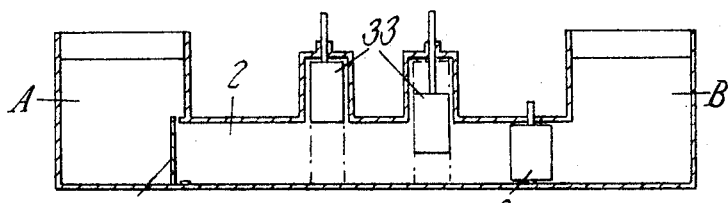
FIGURE 8 is a section on the line VIII—VIII of FIGURE 7.

In FIGURES 7 and 8 special constrictions 33 are shown located in sealed covers above the channels and which may be lowered, as shown in FIGURE 8 as gates into the channels for passive operation.

Figure 9:
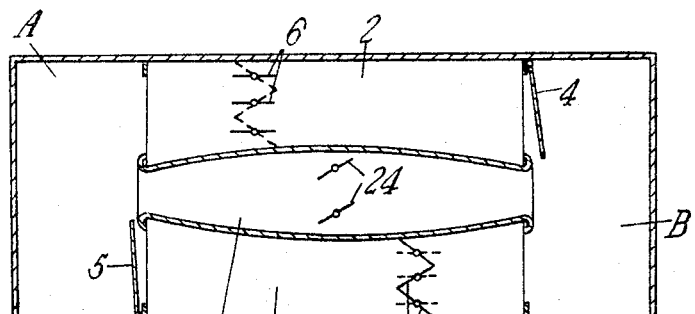
FIGURE 9 is a plan view of yet a further embodiment.

FIGURE 9 shows the arrangement according to FIGURE 6 but modified so that channels 2b, 3b lie one on each side of a central passive channel.

Additional control valves 24' according to FIGURE 1 may be inserted in the channel 23' if desired thus giving a combined passive and controlled passive system.

Where it is intended to use the normally controlled valves to provide static resistance to the water flow in the channel or channels these may be locked in various positions as shown in FIGURE 2, where 46 is a locking plate, provided with a series of holes 47. Link 48 is connected at one end to the valve actuating link 19' and at the other end is provided with a pin to engage any of the holes 47.

Various modifications may be made according to the invention. Thus in FIGURE 1 the valves 6 and 7 could be changed to be opened fully as soon as they are engaged by the arm 10 and to be returned only when the arm 10 returns to its neutral position.

I claim:
1. A stabilizing system for a floating body comprising tanks for containing liquid disposed one on each side of the floating body, at least one channel interconnecting the two tanks, roll-sensitive means mounted on the floating body, control valve means responsive to said roll-sensitive means to permit the flow of liquid through the channel in the direction required for stabilizing the roll of the floating body, non-return valve means for said channel, and means for controlling the non-return valve means from the roll-sensitive means in relation to the direction of flow so that said non-return valve means functions as a non-return valve for the flow between the tanks in either one direction or the other alternatively.

2. The stabilizing system as claimed in claim 1 comprising two channels interconnecting the tanks, control valve means responsive to the roll-sensitive means mounted in each channel, non-return valve means mounted to restrain flow between the tanks through one of the channels in a particular direction and non-return valve means mounted to restrain flow between the tanks through the other channel in the opposite direction.

3. The stabilizing system as claimed in claim 2 comprising means for increasing the resistance to flow in the respective channels.

4. The stabilizing system as claimed in claim 3 comprising means to set the control valves to a desired position constricting the water flow.

5. The stabilizing system as claimed in claim 3 comprising at least one constriction located in a sealed cover above the channel for lowering into the channel to constrict flow.

6. A ship stabilizing system comprising tanks disposed on each side of the ship, two channels interconnecting the tanks, non-return valves of the flap type within each channel, whereby flow between the tanks in one direction is restricted to one of the channels and in the other direction is restricted to the other of the channels, and control valves in each channel for regulating the amount of flow.

7. A ship stabilizing system as claimed in claim 6, comprising means sensitive to the roll of the ship and means responsive thereto connected to operate the control valve.

References Cited by the Examiner
UNITED STATES PATENTS

| | | | |
|---|---|---|---|
| 2,894,472 | 7/1959 | Foster | 114—125 X |
| 3,192,888 | 7/1965 | Field | 114—125 |
| 3,195,497 | 7/1965 | Field | 114—125 |

FOREIGN PATENTS 30,940   7/1926   France.

MILTON BUCHLER, *Primary Examiner.*
T. M. BLIX, *Assistant Examiner.*